United States Patent [19]
Blech

[11] Patent Number: 4,785,215
[45] Date of Patent: Nov. 15, 1988

[54] RESONANT ELEMENT FORCE TRANSDUCER FOR ACCELERATION SENSING

[75] Inventor: Joab J. Blech, Haifa, Israel

[73] Assignee: Israel Aircraft Industries Ltd., Lod, Israel

[21] Appl. No.: 117,221

[22] Filed: Nov. 5, 1987

[30] Foreign Application Priority Data

Nov. 7, 1986 [IL] Israel .......................................... 80550

[51] Int. Cl.⁴ .......................................... H01L 41/08
[52] U.S. Cl. ...................................... 310/329; 310/323; 310/370; 310/367; 73/517 AV; 73/862.59
[58] Field of Search ............... 310/321, 323, 329, 338, 310/367, 370, 25; 73/777, 778, 781, 141 R, 517 R, 517 AV, DIG. 4, 862.59

[56] References Cited

U.S. PATENT DOCUMENTS

| | | | |
|---|---|---|---|
| 4,221,131 | 9/1980 | Albert | 73/517 AV |
| 4,321,500 | 3/1982 | Paros | 310/321 |
| 4,372,173 | 2/1983 | Fer Nisse et al. | 73/862.59 |
| 4,445,065 | 4/1984 | Albert | 310/367 X |
| 4,450,378 | 5/1984 | Hermann et al. | 310/367 X |
| 4,517,841 | 5/1985 | Peters et al. | 73/517 AV |
| 4,538,461 | 9/1985 | Juptner et al. | 310/370 X |
| 4,654,663 | 3/1987 | Alsenz et al. | 310/367 X |
| 4,724,351 | 2/1988 | Eer Nisse et al. | 310/328 |
| 4,742,260 | 5/1988 | Shimizu et al. | 310/370 X |

FOREIGN PATENT DOCUMENTS

| | | | |
|---|---|---|---|
| 8403998 | 11/1984 | Int'l Pat. Institute . | |
| 4634867 | 3/1968 | Japan | 310/370 |
| 0048990 | 4/1977 | Japan | 310/367 |
| 0003411 | 1/1983 | Japan | 310/367 |
| 2141231 | 8/1986 | United Kingdom . | |

Primary Examiner—Mark O. Budd
Attorney, Agent, or Firm—Dennis P. Clarke

[57] ABSTRACT

A resonant element force transducer comprising a doubled back beam comprising a single transducer element having a crossmember to one side of which there extends integrally formed therewith at least a pair of coplanar outer beams of substantially equal length and at least one inner beam coplanar with and disposed between the outer beams in substantially parallel fashion, the free ends of the outer beams being coupled to one of a first mounting pad and a second mounting pad, the free end of the at least one inner beam being coupled to the other of the first and second mounting pads.

21 Claims, 3 Drawing Sheets

RESONANT ELEMENT FORCE TRANSDUCER FOR ACCELERATION SENSING

FIELD OF THE INVENTION

The present invention relates to digital accelerometers, more particularly, to digital accelerometers using resonant force transducers which have reduced longitudinal pumping.

BACKGROUND OF THE INVENTION

There are known digital accelerometers using resonant force transducers for acceleration sensing. An example of the kind of force transducer used in these applications is the double resonant beam force transducer shaped as a double-ended tuning fork as disclosed in U.S. Pat. No. 4,372,173 Eer Nisse et al (1983) and International Application Publication No. WO 84/03998. These patents identify the problem of energy coupling from the beam to the force transmitting structure, known as longitudinal pumping. This is described as undesireable for its degrading of both the Q and the linearity of the transducer.

The operation of these devices is based on measurement of deviation in frequency from that established in a bias condition where no-load is applied to the transducer. The frequency measurement provided in the bias condition is used as a reference for these deviation measurements.

A technique for reducing longitudinal pumping is proposed in the above mentioned International Application by provision of the beams with a non-uniform width, so that in one configuration the beams are bowed inwardly, in an attempt to have substantially equal deflection of the beam inwardly and outwardly. The shaping required to achieve this result is stated in approximate terms as a percentage of the beam width relative to the width of the gap between the beams at the midpoint and ends of their lengths. However, the particular shaping is not determined precisely. Even with the shaping suggested the problem of longitudinal pumping is not eliminated.

The problem of energy coupling to the support structure is also the subject of U.S. Pat. No. 4,321,500 to Paros. Here, a solution is suggested in which longitudinal isolation elements from part of the transducer structure but again, the shaping is complex and the problem of longitudinal pumping is not eliminated.

The problem of energy coupling is also discussed in connection with the resonant force transducer shape proposed by British Pat. No. 2,141,231 to Kirman et al. Here, the structure of the transducer is a double-ended design with at least three coplanar beams generally parallel with one another which are supported at each end by a common mounting. No disclosure is made of a definite increase in efficiency resulting from this arrangement.

Another approach to acceleration sensing using force transducers is based on a push-pull configuration as disclosed by U.S. Pat. Nos. 4,221,131 to Albert (1980) and 4,517,841 to Peters et al (1985). The push-pull configurations generally require the use of two individual transducer elements arranged back-to-back so that the motion of their respective proof masses is in opposite directions, and this makes for a complicated design.

In all of the above cases, the magnitude of the energy loss due to longitudinal pumping in a double-ended tuning fork or single beam is related to the kinetic energy imparted to the mounting pads or proof mass. In acceleration sensors, for a given amplitude of vibration and geometry of the beam, this can be shown to be proportional to the square of the longitudinal velocity of beam supporting the proof mass. This is analogous to the displacement of the mounting pads of a resonant force transducer. It would therefore be desirable to reduce the kinetic energy imparted respectively to the mounting pads or the proof mass and so improve the performance of the force transducer in respective force and acceleration sensing applications.

SUMMARY OF THE INVENTION

Accordingly, it is a principal object of the invention to overcome the above-mentioned disadvantages and provide a resonant element force transducer based on a single transducer element which exhibits reduced pumping losses for use in acceleration sensing applications.

According to the invention, there is provided a resonant element force transducer comprising;

a doubled back beam comprising a single transducer element having a crossmember to one side of which there extends integrally formed therewith at least a pair of coplanar outer beams of substantially equal length and at least one inner beam coplanar with and disposed between the outer beams in substantially parallel fashion, the free ends of the outer beams being coupled to one of a first mounting pad and a second mounting pad, the free end of the at least one inner beam being coupled to the other of the first and second mounting pads.

In a preferred embodiment, the doubled back beam construction is configured as a single transducer element in which the inner beam is a resonator shaped as a double beam tuning fork extending from the crossmember and being located between a pair of integrally formed outer beams providing a vibration isolator. Thus, four beams extend to one side of the crossmember in substantially parallel fashion, the two outer beams being coupled at their free ends by a proof mass. The two inner beams have their free ends terminated in a mounting pad and coupled to a support structure. The proof mass is responsive to an input acceleration, producing a measurable frequency shift in the resonator from the no-load condition in which there are no pumping losses.

In an alternative embodiment, the coupling of the outer beams and the inner beams is reversed, the former being terminated in a mounting pad and coupled to the support structure and the latter being coupled to the proof mass.

In another alternative embodiment, the outer beams are shaped symmetrically with respect to the inner beam, each of the outer beams having at least one bend.

In still another alternative embodiment, the doubled back beam construction is configured as a single transducer element having the inner beam formed as a single beam resonator. As above, the coupling of the single beam resonator and the outer beams may be to either of the proof mass or support structure. A modification to this arrangement is the provision of vibration isolation structures on either end of the single beam resonator.

In still a further alternative embodiment, the doubled back beam construction is configured as a single transducer element shaped as a pair of nested tuning forks integrally formed with the crossmember. The two outer beams provide the tines of one of the tuning forks as a resonator which is joined at its free ends by a mounting pad and coupled to the proof mass. The two inner beams provide the tines of the other tuning fork as a resonator which has its free ends terminated in a mounting pad and coupled to the support structure. A push-pull configuration is thereby provided and the proof mass is responsive to an input acceleration, producing a measurable frequency shift.

In yet a further alternative embodiment, the coupling of the free ends of each of the nested double ended tuning forks to the support structure and proof mass is reversed.

Other features of the invention will become apparent from the drawings and the description contained hereinbelow.

BRIEF DESCRIPTION OF THE DRAWINGS

For a better understanding of the invention with regard to the embodiments thereof, reference is made to the accompanying drawings, in which.

DETAILED DESCRIPTION OF THE PREFERRED EMBODIMENTS

Figure 1:
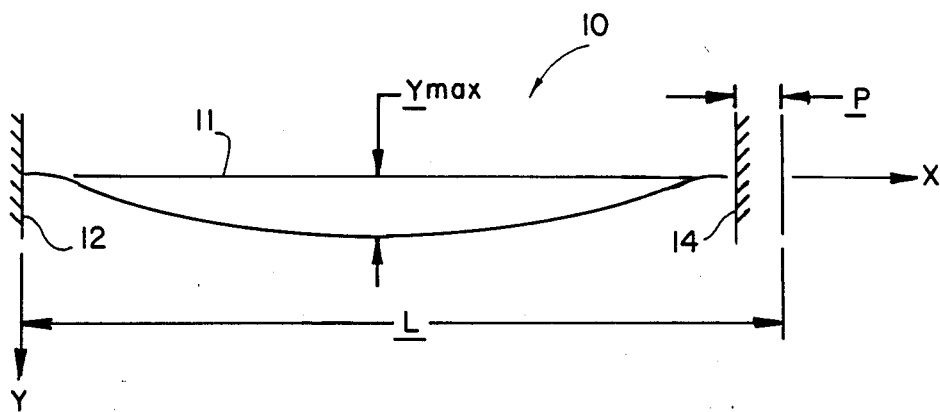
FIG. 1 is a schematic representation of a prior art single beam force transducer having longitudinal pumping losses.

Referring now to FIG. 1, there is shown a schematic representation of a prior art single resonant beam force transducer 10 having longitudinal pumping losses. A single beam 11 of length L is clamped at both ends 12 and 14. The following analysis of single resonant beam transducer 10 with regard to the longitudinal pumping losses is applicable to the case of a double resonant beam force transducer shaped as a double-ended tuning fork. Such a construction is described, for example, in the above-referenced U.S. patent to Eer Nisse et al, which because of this shape is actually two identical single beams.

When it vibrates flexurally at its lowest natural frequency, beam 11 has a mid-span displacement of Ymax. The longitudinal displacement of one end 14 with respect to the other 12 is defined as the pumping P which can be expressed in terms of the kinetic energy transferred by the beam to a proof mass (not shown) attached to one of its ends 12 or 14. The pumping P is computed by:

$$P = \tfrac{1}{2} \int_0^L (dY/dX)^2 \, dX \tag{1}$$

As the deflection of beam 11 along its length L is satisfactorily approximated by the deflection curve of a uniformly loaded beam, the pumping P can be shown to be equivalent to:

$$P = 2.44 \, (Ymax)^2/L \tag{2}$$

If beam 11 is assumed to vibrate in simple harmonic motion of a circular frequency w and mid-span amplitude Ym, then the maximum displacement Ymax can be represented by:

$$Ymax = Ym \sin(wt) \tag{3}$$

Therefore, the pumping P of beam 11 under these conditions will be as determined by substituting equation (3) in equation (2):

$$P = 2.44 * Ym^2 \sin^2(wt)/L \tag{4}$$

or alternatively, $$P = 1.22 * Ym^2(1 - \cos 2wt)/L \tag{5}$$

Equation (5) indicates that the pumping frequency is twice the beam vibration frequency w. The pumping velocity Vp is the relationship necessary for computation of the kinetic energy transferred by beam 11, and is equivalent to the first derivative with respect to time of the equation (5) expression for the pumping magnitude, which can be represented by the following equation:

$$Vp = 2.44 * Ym^2 w \sin 2wt/L \tag{6}$$

In an acceleration sensor, the energy transfer by beam 11 can be determined by looking at the kinetic energy Tp imparted to a proof mass Mp (not shown) attached to one end of beam 11. An indication of the energy transfer in a resonant beam force transducer case is obtained by looking at displacement of the mounting pad, with the kinetic energy Tp in either case being dependent on the pumping velocity Vp as follows:

$$Tp = \tfrac{1}{2} Mp * Vp^2 \tag{7}$$

Thus, it can be seen that the kinetic energy Tp imparted to a proof masss Mp is a function of the vibration frequency w by substituting equation (7) into equation (6):

$$Tp \approx 3 Ym^4 w^2 Mp \sin^2 2wt/L^2 \tag{8}$$

Over one vibration cycle of beam 11, the average kinetic energy imparted to the proof mass is:

$$Tp \, (avg.) = \tfrac{1}{2}\pi \int_0^{2\pi} Tp \, d(wt) \tag{9}$$

Inserting equation (8) into equation (9) gives:

$$Tp \, (avg.) = 1.5 * Ym^4 w^2 Mp/L^2 \tag{10}$$

Equation (10) for the average kinetic energy transfer for the single resonant beam force transducer of FIG. 1 provides a useful expression against which the average kinetic energy transfer of the resonant beam force transducer configuration of the present invention can be compared, as hereinbelow described.

Figure 2:
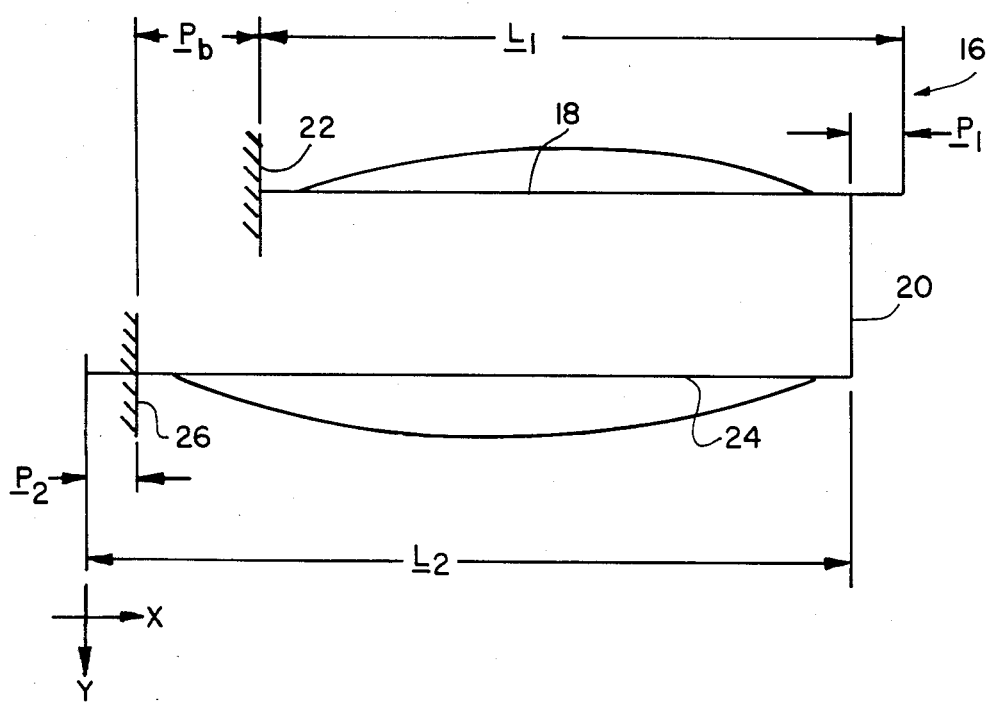
FIG. 2 is a schematic representation of one-half of a doubled back beam force transducer in accordance with the principles of the present invention.

Turning now to FIG. 2, there is shown a schematic representation of one-half of a doubled back beam force transducer 16 in accordance with the principles of the present invention. A first branch 18 of length L1 is shown extended between a cross beam 20 and a clamped end 22, with a second branch 24 of length L2 extending in substantially parallel fashion from crossmember 20 to a proof mass 26. Clamped end 22 is rigidly fixed to a support structure (not shown).

When each of branches 18 and 24 vibrates flexurally, a Y displacement is produced which causes longitudinal pumping. The kinetic energy imparted to proof mass 26 is a function of the longitudinal pumping. As will be seen from the following analysis, the configuration of transducer 16 in accordance with the invention achieves a reduction in the longitudinal pumping and average kinetic energy transfer over the prior art such that overall performance of transducer 16 is improved.

The longitudinal pumping of branch 18 is denoted by P1, and the longitudinal pumping of branch 24 is denoted by P2. For the sake of simplicity of analysis, it is assumed that both branches 18 and 24 have the same length, that is L1=L2, although this is not necessary. As shown, the total pumping Pb of the system is:

$$Pb = P1 - P2 \quad (11)$$

From equation (5) of the earlier analysis with respect to FIG. 1, the longitudinal pumping of each branch 18 and 24 is:

$$Pi = 1.22 Ym^2 (1 - \cos w_i t); (i=1,2) \quad (12)$$

where w1, w2 are the respective circular vibration frequencies of the first and second branches 18 and 24. These vibration frequencies w1 and w2 are the same when transducer 16 is operating in a no-load condition, known as the bias condition, and thus the pumping losses equal zero, as per equation (11). When there is an input acceleration to the support structure and an axial force is created in transducer 16, one of branches 18 and 24 is in tension, while the other is in compression, thus causing vibration frequencies w1 and w2 to differ.

Figure 3A:
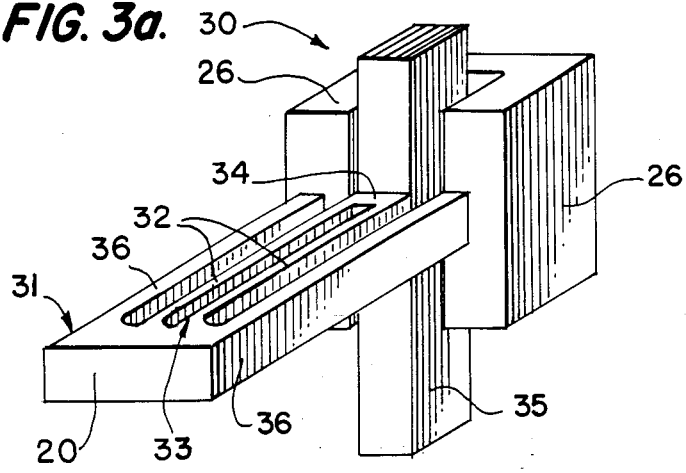
FIGS. 3a-b show, respectively, a perspective view and a top view of a preferred embodiment of a resonant element force transducer in accordance with the principles of the present invention based on the construction of FIG. 2.
Figure 3B:
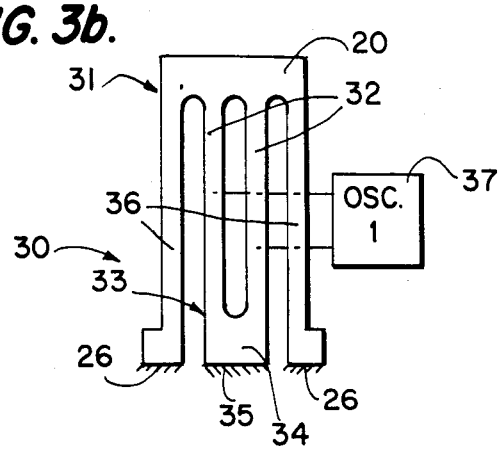

For the sake of simplicity in analysis, it is assumed that both branches 18 and 24 have the same mid-span vibration amplitude, Ym. If different vibration amplitudes occur, Ym must be indexed in the following equations, however, the end conclusion will be the same. The case of different vibration amplitudes is illustrated in FIGS. 3a-b where w1=w2 and the midspan vibration amplitudes Ym are different.

By substituting equation (11) into equation (10), the total pumping of the system becomes:

$$Pb = 1.22 Ym^2 (\cos 2w1t - \cos 2w2t)/L \quad (13)$$

The form of equation (13) can be changed by introducing factors w and λ representing the average and half the relative difference between the vibration frequencies w1 and w2, thus:

$$w = (w1+w2)/2; \lambda = (w1-w2)/2w \quad (14)$$

Solving equation (14) for w1 and w2 gives:

$$w1 = (1+\lambda)w; w2 = (1-\lambda)w \quad (15)$$

Using trigonometric identities and equation (15) the form of equation (13) can be obtained as follows:

$$Pb = 2.44 Ym^2 \sin 2wt \sin 2\lambda wt/L \quad (16)$$

Thus, it can be seen that the total pumping of the system has a beating characteristic with a beat frequency of 2 λw. As before, computation of the kinetic energy Tb imparted by transducer 16 to proof mass 26 requires derivation of the pumping velocity Vp which can be obtained from the equation (13) expression for total pumping:

$$Vp = 2.44 Ym^2 (w2 \sin 2w2t - w1 \sin 2w1t)/L \quad (17)$$

The instantaneous kinetic energy of proof mass 26 Tb is given by:

$$Tb = \tfrac{1}{2} Mp * Vp^2 \quad (18)$$

Substituting equation (17) into equation (18), the average kinetic energy for a beat cycle π/λw can be computed from the following integral:

$$Tb \text{ (avg.)} = \quad (19)$$

$$\tfrac{1}{2} Mp \lambda w/i \, (2.44 \, Ym^2/L)^2 \int_0^{\pi/\lambda w} (w2\sin 2w2t - w1\sin 2w1t)^2 \, dt$$

The resulting integration and substitution in terms per equation (14) provides the average kinetic energy, for sufficiently small values of λ, as $$Tb \text{ (avg.)} \approx 3 Mp Ym^4 w^2 \lambda^2 / L^2 \quad (20)$$

This last expression provides the average kinetic energy transfer of transducer 16 and can be compared as a ratio to the average kinetic energy transfer derived above in equation (10) for a single beam or double resonant beam transducer, thus:

$$N = Tb \text{ (avg.)}/Tp \text{ (avg.)} = 2\lambda^2 \quad (21)$$

Typical values of λ for quartz crystal resonator force transducers are in the range of 0.1. It can be seen, from equation (21), that with such values of λ, the kinetic energy imparted proof mass 26 of the dooubled back beam force transducer 16 of the present invention is much smaller than that which is imparted to the proof mass of the prior art single beam force transducer of FIG. 1.

Referring now to FIGS. 3a-b, there are respectively shown perspective and top views of a preferred embodiment of a resonant element force transducer 30 in accordance with the present invention. The construction of force transducer 30 is based on the doubled back beam construction of FIG. 2 and is configured as a single transducer element 31 shaped as a tuning fork extending to one side of and integrally formed with crossmember 20. The free ends of transducer element 31 can be terminated in a set of mounting pads, or they can be terminated in a combination of a proof mass and a mounting pad.

As shown in FIGS. 3a-b, four coplanar beams extend to one side of crossmember 20 in parallel fashion, the two inner beams 32 corresponding to branch 18 of FIG. 2 and providing a resonator 33 with its free ends terminated in a mounting pad 34 and coupled to support structure 35 corresponding to clamped end 22 of FIG. 2. The two outer beams 36 correspond to branch 24 of FIG. 2 and provide a vibration isolation structure which is coupled at its free ends to proof mass 26. Crossmember 20 is not mounted to the support structure 35 and is free to move longitudinally with the vibrations set up in the beams.

The transducer element 31 is preferably made of a piezoelectric material, such as quartz crystal, and its shape is achieved in accordance with known manufacturing techniques such as chemical etching or particle abrasion. In FIG. 3b, each of inner beams 32 is shown connected to a conventional oscillator 37 in schematic fashion in accordance with known techniques for setting up the resonant frequency of beam oscillation.

In operation of force transducer 30 as an accelerometer, proof mass 26 is responsive to an input acceleration, producing a measurable frequency deviation in resonator 33, with reduced longitudinal pumping losses as per the above analysis, e.g. equation (11). The result is improved sensitivity and increased linearity in the measurements provided by force transducer 30.

It should be noted that it is possible to reverse the coupling of mounting pad 34 and outer beams 36 with respect to support structure 35 and proof mass 26.

Figure 4A:
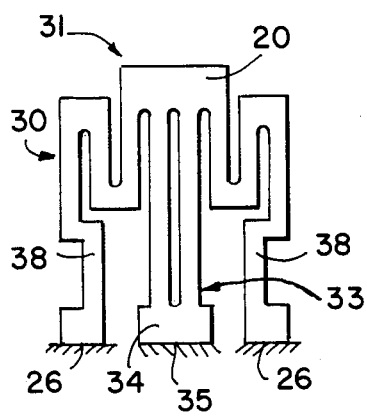
FIGS. 4a-c show schematic representations of respective alternative embodiments of the transducer of FIGS. 3a-b.
Figure 4B:
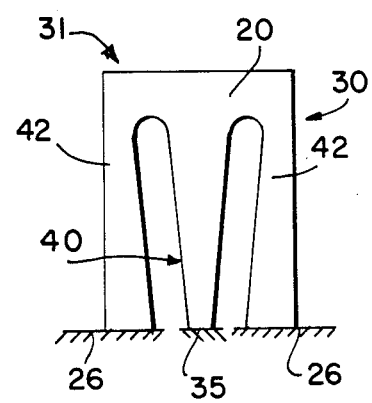
Figure 4C:
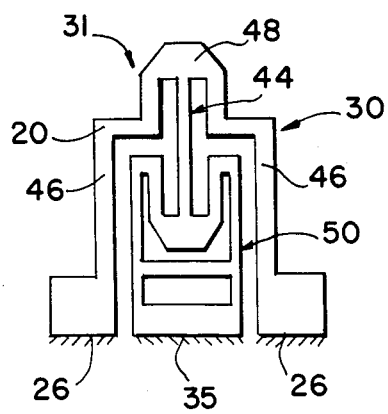

Turning now to FIGS. 4a-c there are shown schematic representations of respective alternative embodiments of force transducer 30 of FIGS. 3a-b. The alternative embodiment of FIG. 4a is similar to that of FIGS. 3a-b in that single transducer element 31 comprises a resonator 33 extending to one side of and integrally formed with crossmember 20. However, the shape of each of the outer beams 38 has a series of bends which are symmetrical with respect to the inner beams forming resonator 33. The coupling of resonator 33 and outer beams 38 is similar to that shown in FIGS. 3a-b or it may be reversed.

The alternative embodiment of FIG. 4b comprises a single beam resonator 40 disposed between the outer beams 42, all extending to one side of and integrally formed with crossmember 20. Similarly, the alternative embodiment of FIG. 4c comprises a single beam resonator 44 disposed between the outer beams 46. However. single beam resonator 44 is supported by vibration isolation structures 48 and 50 on each of its ends. as described in U.S. Pat. No. 3,470,400 to Weisbord. Vibration isolation structure 48 is formed as an integral part of crossmember 20 and isolation structure 50 is provided between single beam resonator 44 and support structure 35.

As before, the coupling of the resonators 40 and 44 in the respective figures may be reversed from that shown.

Figure 5A:
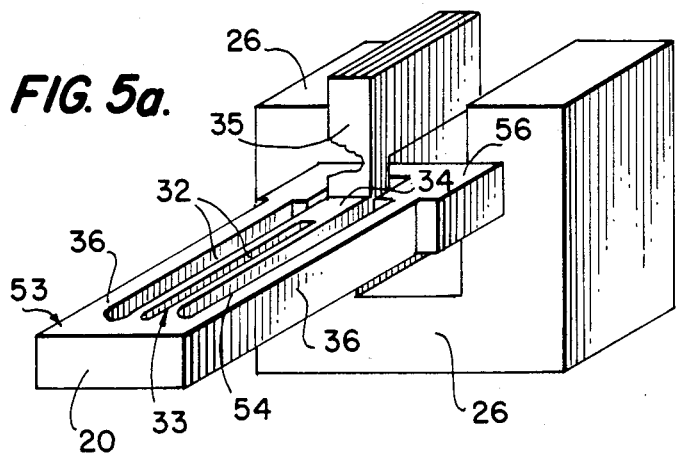
FIGS. 5a-b show, respectively, a perspective view and a top view of an alternative embodiment of the transducer of FIGS. 3a-b based on a push-pull configuration.
Figure 5B:
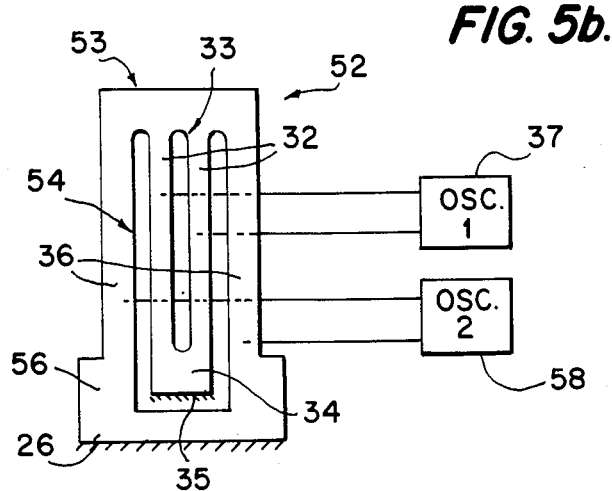

Referring now to FIGS. 5a-b, there are shown, respectively, perspective and top views of a force transducer 52 as an alternative embodiment of the construction of FIGS. 3a-b. Transducer 52 incorporates a push-pull configuration of single transducer element 53 as a pair of nested resonators extending to one side of and integrally formed with crossmember 20.

As before, inner beams 32 provide the tines of resonator 33. However, in this configuration, outer beams 36 provide the tines of a second resonator 54. Exterior beams 36 are joined at their free ends by a mounting pad 56 and coupled to proof mass 26. A push-pull configuration is thereby provided.

FIG. 5b shows the connection of each of resonators 33 and 54 to respective conventional oscillators 37 and 58 in accordance with known techniques for setting up the resonant frequency of beam oscillation as earlier described.

In operation of force transducer 52 as an accelerometer, proof mass 26 is responsive to an input acceleration, producing a difference frequency between resonators 33 and 54, the difference frequency being proportional to the acceleration and being such as to provide reduced longitudinal pumping losses as per the above analysis. The result is improved sensitivity and increased linearity in the measurements provided by force transducer 52.

The principles of construction exhibited in FIGS. 5a-b are applicable to FIGS. 4a-c such that a push-pull configuration is obtainable. In each case, the outer beams are joined by a mounting pad and coupled to either of proof mass 26 or support structure 35.

Thus, in accordance with the present invention, there is provided a resonant element force transducer using a single transducer element provided as a doubled back beam based on a novel construction which achieves a reduction in longitudinal pumping losses. The result is an improvement in the sensitivity and linearity of measurements provided by the transducer, which can be adapted for use as an accelerometer. A push-pull configuration is also provided as an alternative embodiment of the single transducer element.

While the principles of the invention have been described with regard to particular embodiments, it is to be understood that the description is made by way of example only and not as a limitation on the scope of the invention, which is set forth in the appended claims.

I claim:

1. A resonant element force transducer comprising;
a doubled back beam comprising a single transducer element having a crossmember to one side of which there extends integrally formed therewith at least a pair of coplanar outer beams of substantially equal length and at least one inner beam coplanar with and disposed between said outer beams in substantially parallel fashion, the free ends of said outer beams being coupled to one of a first mounting pad and a second mounting pad, the free end of said at least one inner beam being coupled to the other of said first and second mounting pads.

2. The transducer of claim 1 wherein said inner beam is a resonator provided as a double beam tuning fork which has its free ends terminated in said first mounting pad for coupling to a support structure, said outer beams providing a vibration isolator having its free ends terminated in said second mounting pad for coupling to a proof mass.

3. The transducer of claim 1 wherein said inner beam is a resonator provided as a double beam tuning fork which has its free ends terminated in said first mounting pad for coupling to a proof mass, said outer beams providing a vibration isolator having its free ends terminated in said secondmounting pad for coupling to a support structure.

4. The transducer of claim 2 wherein said vibration isolator is shaped symmetrically with respect to said resonator, each of said vibration isolator outer beams having at least one bend.

5. The transducer of claim 3 wherein said vibration isolator is shaped symmetrically with respect to said resonator, each of said vibration isolator outer beams having at least one bend.

6. The transducer of claim 1 wherein said inner beam is a resonator provided as a single beam resonator which has its free end terminated in said first mounting pad for coupling to a support structure, said outer beams providing a vibration isolator having its free ends terminated in said second mounting pad for coupling to a proof mass.

7. The transducer of claim 1 wherein said inner beam is a resonator provided as a single beam resonator which has its free end terminated in said first mounting pad for coupling to a proof mass, said outer beams providing a vibration isolator having its free ends terminated in said second mounting pad for coupling to a support structure.

8. The transducer of claim 6 further comprising a pair of vibration isolation structures, each one of said pair of structures supporting an end of said single beam resonator.

9. The transducer of claim 7 further comprising a pair of vibration isolation structures, each one of said pair of structures supporting an end of said single beam resonator.

10. The transducer of claim 1 wherein said doubled back beam is provided in a push-pull configuration as a pair of nested tuning forks extending to one side of and integrally formed with said crossmember, such that four beams extend from said crossmember in parallel fashion, said inner beam providing the tines of one of said tuning forks as a resonator having its free ends terminated in said first mounting pad for coupling to a support structure, said two outer beams providing the tines of the other of said tuning forks as a resonator having its free ends terminated in a said second mounting pad for coupling to a proof mass.

11. The transducer of claim 1 wherein said doubled back beam is provided in a push-pull configuration as a pair of nested tuning forks extending to one side of and integrally formed with said crossmember, such that four beams extend from said crossmember in parallel fashion, said inner beam providing the tines of one of said tuning forks as a beam pair having its free ends terminated in said first mounting pad for coupling to a proof mass, said two outer beams providing the tines of the other of said tuning forks as a beam pair having its free ends terminated in a said second mounting pad for coupling to a support structure.

12. The transducer of claim 1 adapted for use as an accelerometer.

13. The transducer of claim 2 adapted for use as an accelerometer.

14. The transducer of claim 3 adapted for use as an accelerometer.

15. The transducer of claim 4 adapted for use as an accelerometer.

16. The transducer of claim 5 adapted for use as an accelerometer.

17. The transducer of claim 6 adapted for use as an accelerometer.

18. The transducer of claim 7 adapted for use as an accelerometer.

19. The transducer of claim 9 adapted for use as an accelerometer.

20. The transducer of claim 10 adapted for use as an accelerometer.

21. The transducer of claim 11 adapted for use as an accelerometer.

* * * * *